(12) United States Patent
Watanabe

(10) Patent No.: US 8,148,945 B2
(45) Date of Patent: Apr. 3, 2012

(54) DEVICE PROVIDED WITH POWER SUPPLY CIRCUIT

(75) Inventor: Masahiko Watanabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 12/484,080

(22) Filed: Jun. 12, 2009

(65) Prior Publication Data

US 2009/0315521 A1 Dec. 24, 2009

(30) Foreign Application Priority Data

Jun. 23, 2008 (JP) .................................. 2008-163643

(51) Int. Cl.
*H02J 7/06* (2006.01)
*G05F 1/10* (2006.01)

(52) U.S. Cl. ........ 320/128; 320/163; 323/234; 323/266; 323/273

(58) Field of Classification Search .................. 320/127, 320/128, 140, 143, 145, 160, 163, 166, 167; 323/234, 237, 266, 273, 287, 304
See application file for complete search history.

(56) References Cited

U.S. PATENT DOCUMENTS 7,855,532 B2 * 12/2010 Fujiwara ....................... 320/140
2003/0043218 A1 3/2003 Murata

FOREIGN PATENT DOCUMENTS

JP 2003-145892 A 5/2003

* cited by examiner

*Primary Examiner* — Jay Patidar
(74) *Attorney, Agent, or Firm* — Canon USA Inc IP Division

(57) ABSTRACT

A device configured to suppress the occurrence of an inrush current is provided at a low cost, where the device includes a power circuit configured to generate a voltage used to drive a load, a capacitor connected to a supply line provided to supply power from the power circuit to the load, the capacitor being configured in such manner to stabilize the potential of the load, a charging/discharging circuit that supplies an amount of power smaller than a predetermined amount of power to the capacitor and that discharges the smaller amount of power from the capacitor, a charging circuit that supplies an amount of power larger than the predetermined amount of power to the capacitor, and a switch circuit configured to make each of the charging/discharging circuit and the charging circuit operate.

7 Claims, 6 Drawing Sheets

DEVICE PROVIDED WITH POWER SUPPLY CIRCUIT

BACKGROUND OF THE INVENTION

1. Field of the Invention

The present invention relates to a device including a power supply circuit.

2. Description of the Related Art

A recording device converts power into heat by using an electric thermal conversion member provided in a recording head and ejects ink onto the face of a sheet of paper by using the heat. Japanese Patent Laid-Open No. 2003-145892 discloses a capacitor (e.g., an electrolytic capacitor) used to supply power to the electric thermal conversion member while maintaining a stabilized voltage value. A power supply circuit configured to supply the power to the recording head includes a semiconductor switch (such as a field effect transistor (FET)), and opens and/or closes the semiconductor switch as occasion arises. The power supply circuit includes a discharging circuit, so as to discharge electrical charges accumulated in the capacitor to the earth (ground) when the recording device does not perform recording operations.

However, when power is supplied from the power supply to the recording device when the recording device is started and/or before the recording device starts the recording operations, an inrush current having a large current value occurs. This is because there is a large difference between the potentials of the capacitor and the power supply due to a small number of electrical charges accumulated in the capacitor. However, when a circuit configured to decrease the current value is provided, the scale and the cost of the power supply circuit are increased.

SUMMARY OF THE INVENTION

Accordingly, the present invention provides a recording device configured to reduce the occurrence of an inrush current having a large current value at a low cost.

According to an aspect of the present invention, a device is provided that is configured to have a load applied thereto the device such that the load consumes a predetermined amount of power per unit time. The device includes a power circuit configured to generate a voltage used to drive the load; a capacitor connected to a supply line provided to supply power from the power circuit to the load, the capacitor being configured in such manner to stabilize a potential of the load; a charging/discharging circuit that supplies an amount of power smaller than the predetermined amount of power to the capacitor and that discharges the smaller amount of power from the capacitor; a charging circuit that supplies an amount of power larger than the predetermined amount of power to the capacitor; and a switch circuit configured to make each of the charging/discharging circuit and the charging circuit operate.

Further features and aspects of the present invention will become apparent from the following description of exemplary embodiments with reference to the attached drawings.

DESCRIPTION OF THE EMBODIMENTS

Hereinafter, embodiments of the present invention will be described in detail with reference to the attached drawings. In the following embodiments, a recording head will be exemplarily described as a load and a recording device will be exemplarily described as a device.

Figure 1:
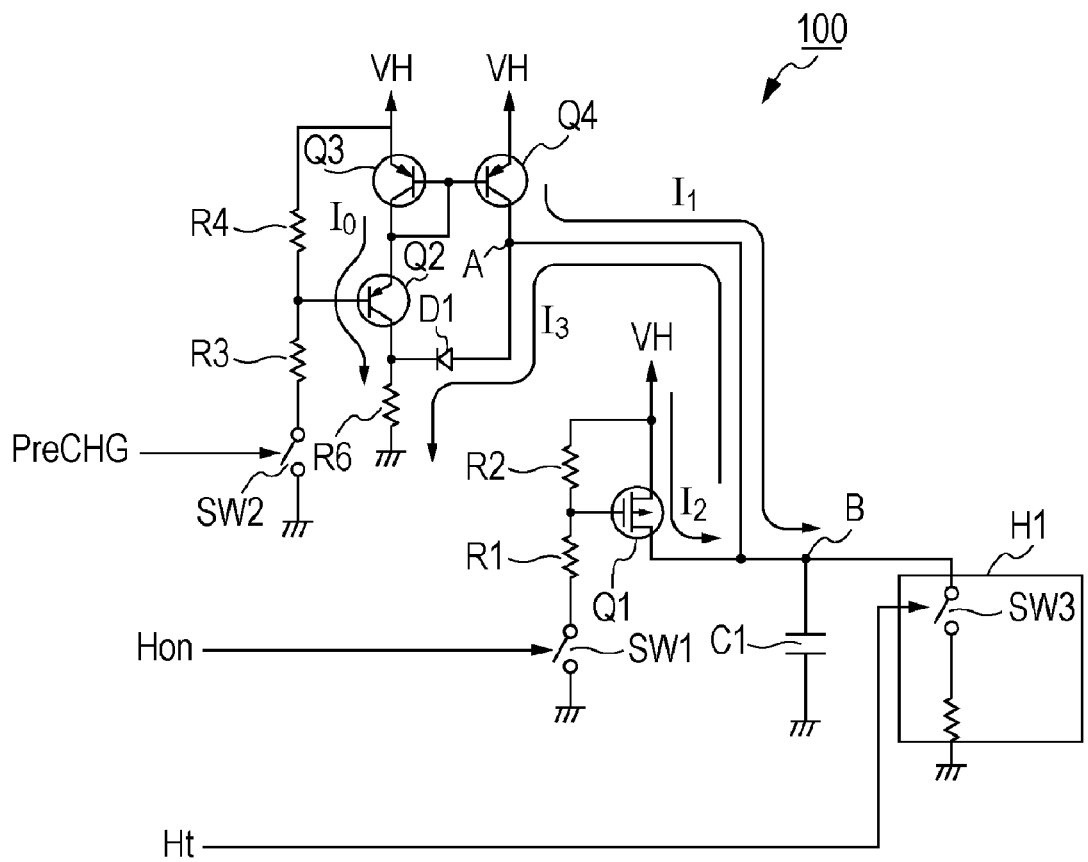
FIG. 1 is an illustration of a power supply circuit according to a first embodiment of the present invention.

FIG. 1 illustrates a power supply circuit (power supply device) 100 according to a first embodiment of the present invention. The power supply circuit 100 includes a recording head H1 configured to eject an ink droplet, a capacitor C1 provided near the recording head H1 so that the potential of the recording head H1 is stabilized, a field effect transistor (FET) Q1, resistors R1 and R2 that are configured to apply a drive voltage to the FET Q1, and a switch SW1 configured to turn on and/or off the FET Q1 based on a signal Hon.

As shown in FIG. 1, the base electrodes of transistors Q3 and Q4 are connected to each other so that a current mirror circuit is provided. A resistor R6 is connected to one of the two transistors Q3 and Q4, so as to determine the reference current of the current mirror circuit.

As the transistor Q2 is turned on/off, the current mirror circuit is switched between the operation state and the stop state. The transistor Q2 is connected between the resistor R6 and the transistor Q3. The resistor R6 is configured to determine the value of a current passed to the transistor Q4. A diode D1 is connected between the collector terminal of the other one of the two transistors, that is, the transistor Q4, resistor R6, and the transistor Q2. The above-described diode D1 is configured to impose a limit so that a current is not transmitted from the transistor Q3 to the recording head H1 and the capacitor C1.

Each of resistors R3 and R4, and a switch SW2 is provided to turn on/off the transistor Q2. The resistors R3 and R4, the switch SW2, and the transistor Q2 are included in a switch circuit configured to switch the current mirror circuit back and forth between the operation state and the stop state.

A signal PreCHG is transmitted to turn on/off the operation of the current mirror circuit. The signal Hon is transmitted to turn on/off the FET. A signal Ht is transmitted to turn on/off the driving of the recording head H1.

Each of the above-described current mirror circuit and FET is provided to transmit a voltage VH generated in a power circuit. Further, the current mirror circuit and the FET are connected to the recording head and/or the capacitor. Thus, the current mirror circuit and the FET are connected in parallel to a power supply line provided to supply power from the power circuit to the recording head.

Figure 2:
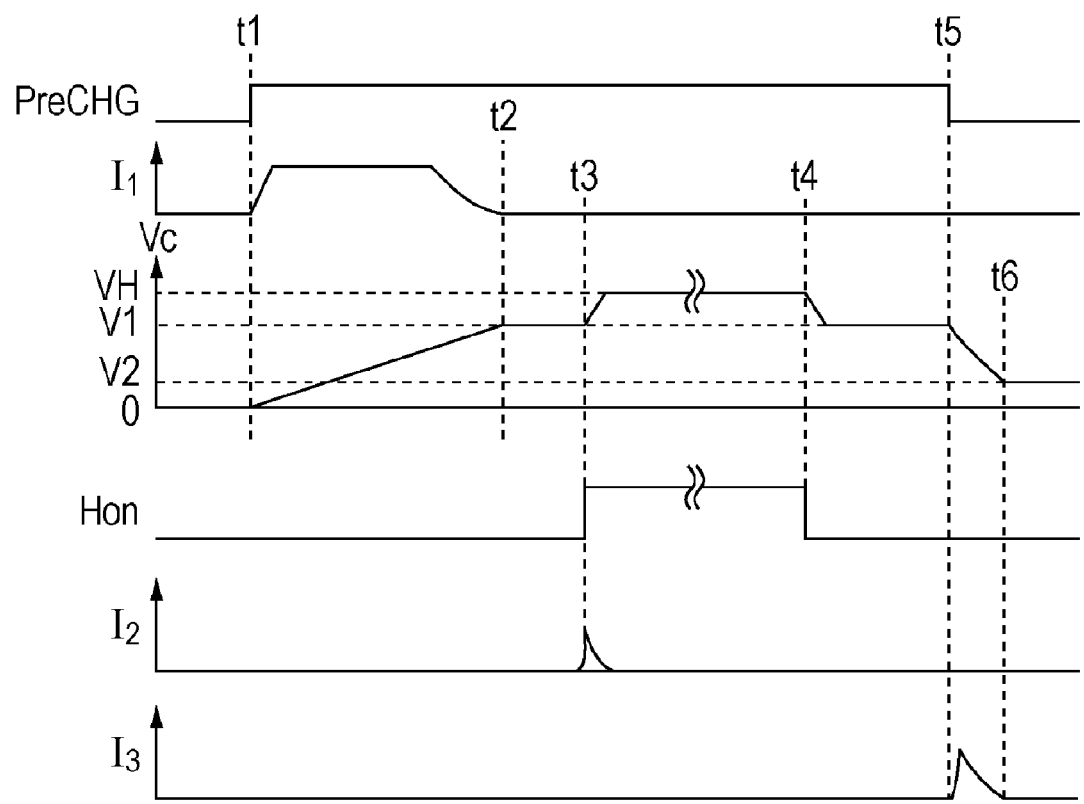
FIG. 2 is a timing chart according to the first embodiment.

FIG. 2 is a timing chart illustrating operations of the circuit shown in FIG. 1. According to FIG. 2, the power of the recording device is in the on state.

First, when the signal PreCHG is allowed to enter the enabled state (high level state) at time t1, the switch SW2 enters the on state and the transistor Q2 enters the saturation-driven state due to a base current determined by the resistors R3 and R4. The resistor value of the resistors R3 and R4 are determined so that the base current is sufficient enough to shift the transistor Q2 to the saturation range.

Since the transistor Q2 is shifted to the saturation range, the transistor Q3 enters the active state. A current I0 is passed based on the value of a voltage obtained by subtracting a base-to-emitter voltage Vbe of the transistor Q3 from the voltage VH supplied from the power supply and a current determined based on the resistor value of the resistor R6. A current I1 equivalent to the above-described current I0 is transmitted from the transistor Q4 to the capacitor C1 and the recording head H1. Consequently, the voltage Vc of the capacitor C1 is gradually increased. Since the capacitor C1 is charged with a constant current, the increase in the voltage Vc also becomes constant.

As the voltage Vc approaches a potential V1 (a voltage lower than the power voltage VH by as much as the voltage Vbe of the transistor Q4) at time t2, the current amount of the current I1 is abruptly decreased. This is because the difference between the emitter potential and the collector potential of the transistor Q (a potential obtained at a point A shown in FIG. 1) is decreased.

When the signal Hon is allowed to enter the enabled state (high level state) at time t3, so as to perform recording operations by using the recording head H1, the FET Q1 enters the on state (the saturation-driven state). When the FET Q1 enters the on state, a current I2 is generated due to the potential difference (Vbe) between the potentials of the power supply and the capacitor. The voltage Vc is increased from the potential V1 to the power voltage VH due to the current I2. Consequently, electrical charges on the voltage-VH level can be accumulated in the capacitor C1.

Further, since the capacitor C1 is filled with the electrical charges (the difference between the potentials of the power supply and the capacitor is reduced), the value of the current I2 becomes 0 within a relatively short time period.

Next, when the state of the signal Hon is changed from the enabled state (high level state) to a disabled state (low-level state) at time t4, the value of the potential Vc is decreased to that of the potential V1. The above-described potential V1 corresponds to the sum of the potential of the collector of the transistor Q2 (a potential obtained at a point C shown in FIG. 1) and a voltage Vf of the diode D1. In that case, the electrical charges accumulated in the capacitor C1 are discharged to the ground via the diode D1 and the resistor R6 so that the potential is decreased to the potential V1.

Next, the state of the signal PreCHG is changed from the enabled state to the disabled state at time t5 and the switch SW2 is turned off. Accordingly, the transistor Q2 is turned off and the operations of the transistor Q3 and/or the transistor Q4 are stopped. Therefore, the discharge of electrical charges from the capacitor C1 via the diode D1 and the resistor R6 is started. A current I3 corresponds to the discharge of the electrical charges. Further, since the electrical charges corresponding to the potential difference Vf of the diode D1 are left in the capacitor C1. Therefore, the potential Vc becomes a potential V2. Here, the state of the signal PreCHG and/or the signal Hon is controlled through a control unit.

Thus, the signal PreCHG is controlled so that preliminary charge processing and discharge processing can be performed for the capacitor C1. The resistor R6 has two rolls (functions) including a function of limiting a current generated to charge the capacitor C1 and a function of limiting a current generated to discharge the electrical charges from the capacitor C1.

Figure 3:
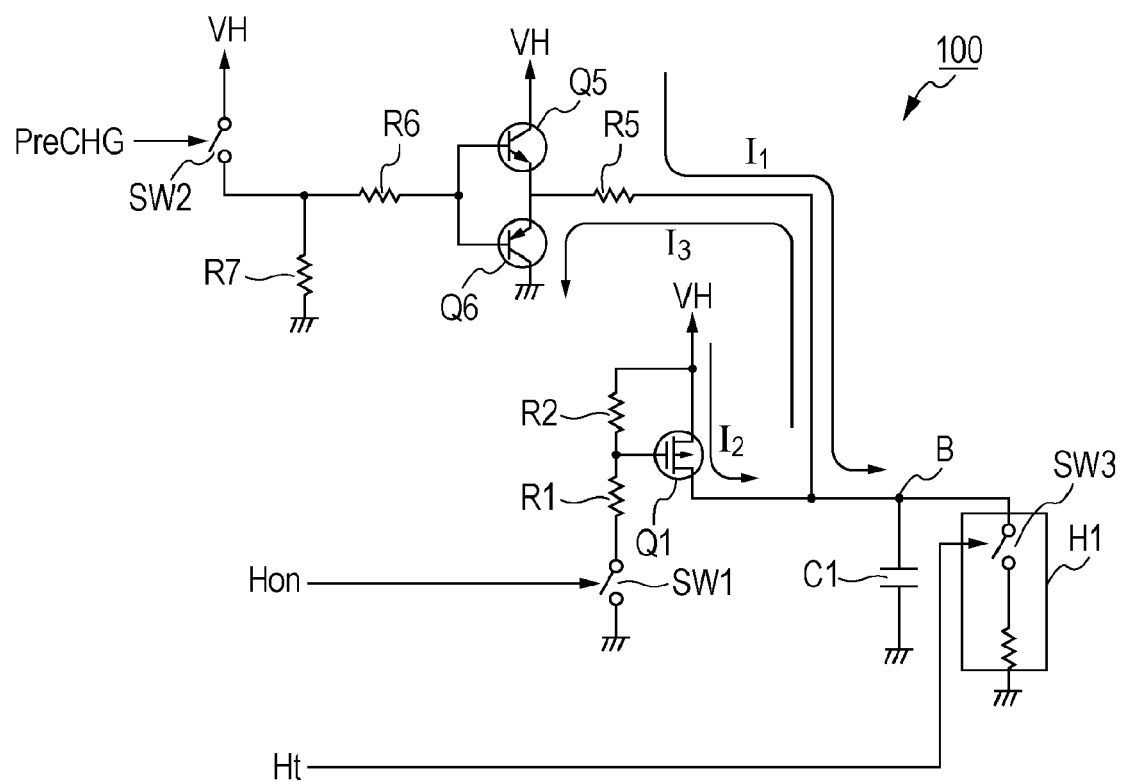
FIG. 3 is an illustration of a power supply circuit according to a second embodiment of the present invention.

FIG. 3 is an illustration of a power supply circuit (power supply device) 100 according to a second embodiment of the present invention. Components configured to perform the same operations as those performed by the components illustrated in FIG. 1 are designated by the same reference numerals. Further, the descriptions of the same components and circuit parts as those shown in FIG. 1 are omitted. Components different from those shown in FIG. 1 will be described.

The emitter electrodes of the transistors Q5 and Q6 are connected to each other so that a push-pull circuit is provided. The switch SW2 turns on/off the push-pull circuit. A resistor R7 dissipates a current passing through the push-pull circuit to the ground. The resistor R6 is configured to determine the base current of the transistor Q5. The resistor R5 is configured to determine the emitter current of each of the transistors Q6 and Q7.

Each of the push-pull circuit and the FET is provided to transmit the voltage VH generated in the power supply circuit. Further, the push-pull circuit and the FET are connected to the recording head and/or the capacitor. Thus, the push-pull circuit and the FET transistor are connected in parallel to the power supply line provided to supply power from the power supply circuit to the recording head.

Figure 4:
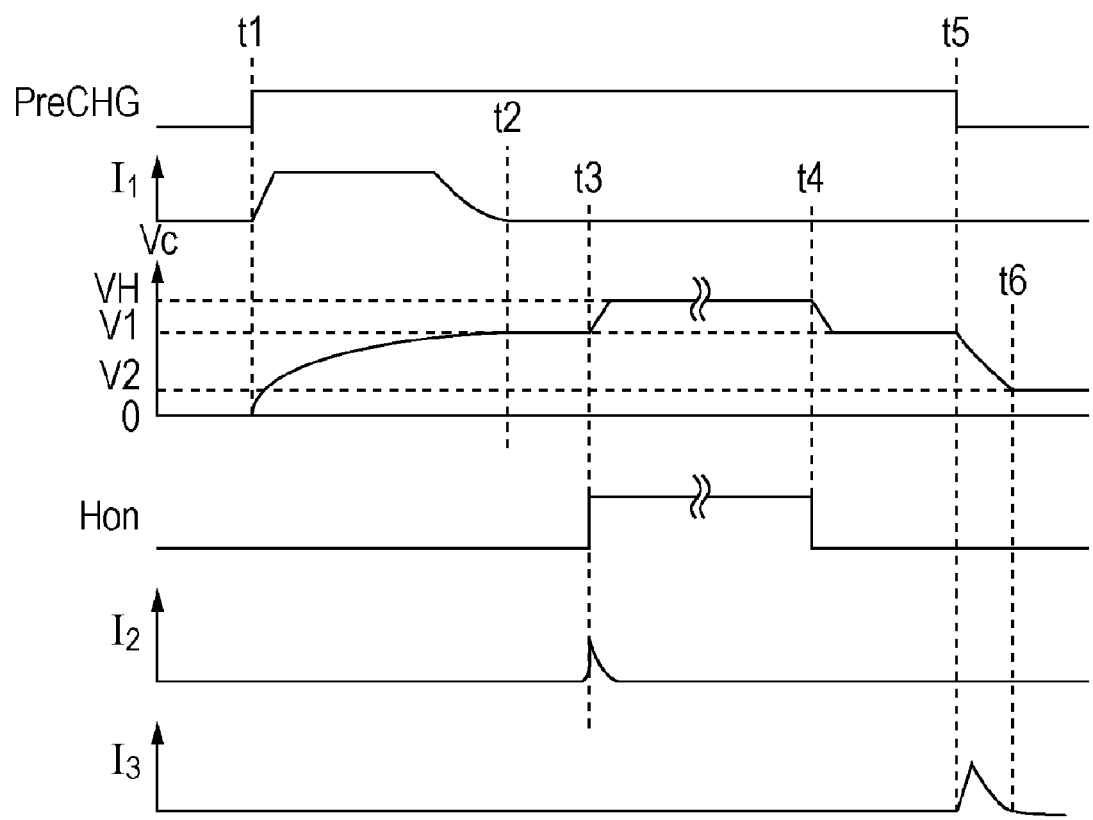
FIG. 4 is a timing chart according to the second embodiment.

FIG. 4 is a diagram illustrating the operations of the power supply circuit 100 shown in FIG. 3. First, when the signal PreCHG is allowed to enter the enabled state (high level state) at time t1, the switch SW2 is turned on so that the voltage VH is applied to the resistors R6 and R7. A base current is generated based on a potential obtained by adding a base-to-emitter voltage Vbe of the transistor Q5 to the emitter potential of the transistor Q5. The emitter current of the transistor Q5 is transmitted to the capacitor C1 via the resistor R5 based on the above-described base current. The above-described current is referred to as a current I1. The capacitor C1 is charged due to the current I1 and the terminal voltage of the capacitor C1 is gradually increased. The state of the gradually increased terminal voltage is indicated by a voltage Vc. The potential of the voltage Vc is increased along a parabola-like curve according to a time constant determined based on the resistor value of the resistor R5 and the capacity of the capacitor C1. The voltage Vc reaches a voltage level lower than the potential VH by as much as the base-to-emitter voltage Vbe of the transistor Q7 at time t2.

The signal Hon is allowed to enter the enabled state (high level state) at time t3. Consequently, the switch SW1 enters the on state, the transistor Q1 is turned on, and the current I2 is passed to the capacitor C1. Therefore, the potential Vc is increased to the potential VH. Although the current I2 is passed at the moment when the transistor Q1 is turned on, the current is converged to zero as the potential Vc approaches the potential VH.

At time t4, the signal Hon is allowed to enter the disenabled state (low level state) at time t4. Since the transistor Q1 enters the off state, the potential Vc is decreased to a voltage level lower than the potential VH by as much as the base-to-emitter voltage Vbe of the transistor Q5.

When the state of the signal PreCHG is changed from the enabled state to the disabled state at time t5, the transistor Q5 enters the off state and the transistor Q6 enters the on state. Accordingly, the base potential of the transistor Q6 becomes relatively lower than the emitter potential of the transistor Q6, and a base current is generated after the base-to-emitter voltage Vbe of the transistor Q6 exceeds a predetermined potential difference. A value of the above-described base current is determined by the resistors R6 and R7. The value of an emitter current passed at that time is Hfe times larger than that of the base current. The above-described emitter current is passed to the collector. At that time, the electrical charges accumulated in the capacitor C1 are discharged via the resistor R5.

Thus, the signal PreCHG is controlled so that the preliminary charge processing and discharge processing can be performed for the capacitor C1. A current indicated by an arrow I3 is generated to discharge the electrical charges accumulated in the capacitor C1. As described above, the resistor R5 functions as a resistor configured to limit the current generated to perform the electrical discharge.

The above-described push-pull circuit may include a circuit configured to prohibit a through current from being passed to the transistors Q5 and Q6.

Thus, in each of the above-described two embodiments, the recording device includes the two power supply circuits having different power supply properties. First, a first amount of power is supplied through a first power supply circuit (a first charging circuit), and a second amount of power is supplied through a second power supply circuit (a second charging circuit). Each of the above-described power amounts is the amount of power supplied per unit time.

Here, the size relationship between the above-described power amounts is indicated as the first power amount<the second power amount. Further, when the maximum amount of power consumed by the recording head so as to perform the recording operations is determined to be a third power amount, the power-amount-size relationship is indicated as the first power amount<the third power amount<the second power amount.

Further, the first power supply circuit has a discharge function. Namely, the first power supply circuit has both the charging function and the discharging function.

Figure 5:
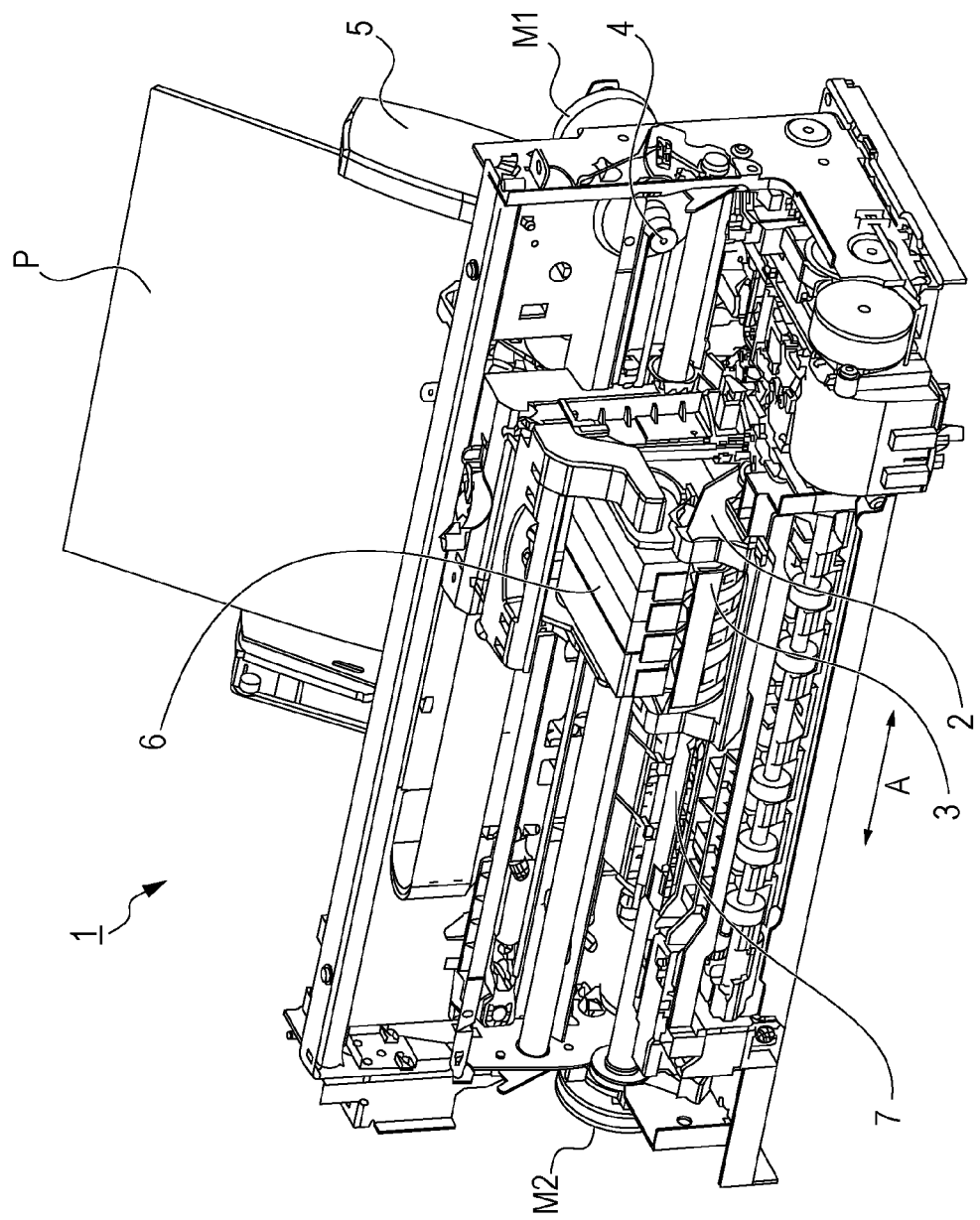
FIG. 5 is a perspective view of a recording apparatus according to an embodiment of the present invention.

Next, an inkjet recording apparatus 1 used for the above-described embodiment will be described. FIG. 5 is a perspective view of the inkjet recording apparatus (hereinafter referred to as the recording apparatus) 1. The recording apparatus 1 includes a recording head 3 mounted on a carriage 2, where the recording head 3 is configured to eject ink and record data under the inkjet scheme. The above-described recording head 3 corresponds to the recording head H1 shown in FIGS. 1 and 2. A transfer mechanism 4 conveys drive power generated through a carriage motor M1 to the carriage 2 so that the carriage 2 reciprocates along the direction indicated by an arrow A. During recording, the carriage 2 feeds a recording medium P including a sheet of recording paper, for example, via a feeding mechanism 5, conveys the recording medium P to the recording position, and performs data recording by ejecting ink from the recording head 3 onto the recording medium P at the recording position. A convey roller 7 is configured to convey the recording medium P and is driven by a convey motor M2.

Not only the recording head 3, but an ink cartridge 6 configured to reserve ink supplied to the recording head 3 is mounted on the carriage 2 of the recording apparatus 1. The ink cartridge 6 is removably mounted on the carriage 2.

The recording apparatus 1 shown in FIG. 5, which can perform color recording, is provided with four ink cartridges mounted on the carriage 2, where a magenta (M) ink, a cyan (C) ink, a yellow (Y) ink, and a black (K) ink are contained in the individual four ink cartridges. The above-described four ink cartridges are separately mounted on the carriage 2 in removable manner.

Here, the joined surfaces of the carriage 2 and the recording head 3 are appropriately brought into contact with each other so that a suitable electrical connection is achieved and maintained. Upon being supplied with energy based on a record signal, the recording head 3 selectively ejects the ink from a plurality of ejection orifices so that data is recorded. Especially, the recording head 3 of the above-described embodiment uses an inkjet scheme so that the recording head 3 ejects the ink by using thermal energy. Therefore, the recording head 3 is provided with an electric thermal conversion member configured to generate the thermal energy.

Figure 6:
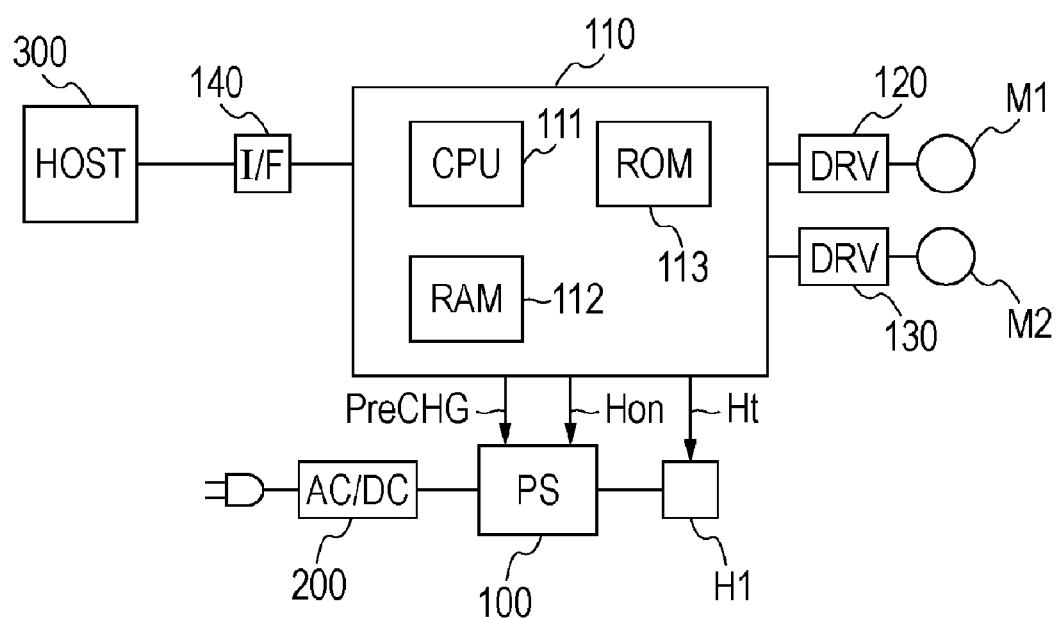
FIG. 6 is an illustration of the control configuration of a recording system according to an embodiment of the present invention.

FIG. 6 is an illustration of the control configuration of an inkjet recording system including a power supply circuit (PS) 100 which is the same power supply circuit as that shown in FIG. 1 and/or the FIG. 3, and a control unit 110 configured to control the operations of the inkjet recording system. The control unit 110 includes a central processing unit (CPU) 111, a random access memory (RAM) 112, and a read only memory (ROM) 113. The inkjet recording system also includes a host apparatus (HOST, a personal computer or the like) 300, an interface unit (I/F) 140, and motor drivers (DRV) 120 and 130.

The inkjet recording system also includes an alternating current (AC)/direct current (DC) conversion circuit (power circuit) configured to convert an AC voltage transmitted from a commercial power supply into a DC voltage. The above-described AC/DC conversion circuit (AC/DC) 200 generates a VH voltage of 20V, for example, and/or a logic voltage of 5V, for example. The VH voltage generated in the AC/DC conversion circuit 200 is transmitted to the power supply circuit 100, which is provided with the two power supply units (charging circuits) having the different power supply properties, as described above. Further, a logic voltage generated in the AC/DC conversion circuit 200 is transmitted to the control unit 110. The control unit 110 changes the state of each of the signal PreCHG and the signal Hon for the power supply circuit (PS) 100. Further, the control unit 110 outputs a signal Ht to the recording head H1 during recording. For example, the recording head H1 and the power supply circuit 100 are arranged on the carriage 2. The power supply circuit 100 and the power circuit are connected to each other via a flexible cable. In a like manner, the power supply circuit 100 and the control unit 110 are connected to each other via the flexible cable.

According to the above-described embodiments, the load is the recording head, and the device is the recording device and/or apparatus, for example. However, the present invention can be achieved without being limited to the above-described embodiments. For example, the load to which power is supplied from the power supply circuit may include, for example, a motor, a heater, and an integrated circuit such as a CPU.

According to the above-described embodiments, the control unit provided to control the power supply circuit 100 is configured to control the operation of the recording device. However, the control unit may be provided as a control circuit specifically designed to control only the power supply circuit 100.

According to another embodiment of the present invention, in the power supply circuit 100, the capacitor C1 and the other circuit part may be separated into two parts so that both the capacitor C1 and the recording head H1 are arranged on the carriage 2.

According to another embodiment of the present invention, a DC voltage may be transmitted to the recording device via a so-called AC adapter. In that case, a DC/DC converter is provided in place of the AC/DC conversion circuit 200.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-163643 filed on Jun. 23, 2008, which is hereby incorporated by reference herein in its entirety.

What is claimed is:

1. A device configured to have a load applied thereto the device such that the load consumes a predetermined amount of power per unit time, the device comprising:
 a power circuit configured to generate a voltage used to drive the load;
 a capacitor connected to a supply line provided to supply power from the power circuit to the load, the capacitor being configured in such manner to stabilize a potential of the load;
 a charging/discharging circuit that supplies an amount of power smaller than the predetermined amount of power to the capacitor and that discharges the smaller amount of power from the capacitor;
 a charging circuit that supplies an amount of power larger than the predetermined amount of power to the capacitor; and
 a switch circuit configured to make each of the charging/discharging circuit and the charging circuit operate.

2. The device according to claim 1, wherein the load is a recording head and the device is a recording device.

3. The device according to claim 1,
 wherein the charging/discharging circuit includes,
  a plurality of transistors;
  a resistor device; and
  a diode,
 wherein base electrodes of two transistors of the plurality of transistors are connected to each other, emitter electrodes of the two transistors are connected to the supplying line, and the resistor device is connected between one of the two transistors and a ground, and
 wherein the diode is connected between a collector of the other one of the two transistors and the resistor device.

4. The device according to claim 1, wherein the charging circuit comprises a field effect transistor.

5. The device according to claim 1, further comprising a control circuit configured to control the switch circuit.

6. The device according to claim 5,
 wherein, when the device starts operating, the control circuit operates the switch circuit, so as to execute a charging operation of the charging/discharging circuit, and operates the switch circuit, so as to execute a charging operation of the charging circuit.

7. The device according to claim 1,
 wherein the charging/discharging circuit comprises a push-pull circuit wherein emitter electrodes of two transistors are connected to each other.

* * * * *